US011171524B2

(12) United States Patent
Chong et al.

(10) Patent No.: US 11,171,524 B2
(45) Date of Patent: Nov. 9, 2021

(54) ELECTROMECHANICAL SYSTEM

(71) Applicant: ROLLS-ROYCE plc, London (GB)

(72) Inventors: Ellis F H Chong, Derby (GB);
Alexander C. Smith, Holmfirth (GB);
Yuanpeng Zhou, Manchester (GB)

(73) Assignee: ROLLS-ROYCE plc, London (GB)

( * ) Notice: Subject to any disclaimer, the term of this patent is extended or adjusted under 35 U.S.C. 154(b) by 58 days.

(21) Appl. No.: 16/733,263

(22) Filed: Jan. 3, 2020

(65) Prior Publication Data

US 2020/0227956 A1 Jul. 16, 2020

(30) Foreign Application Priority Data

Jan. 15, 2019 (GB) .................................... 1900537

(51) Int. Cl.
*H02K 1/14* (2006.01)
*H02K 1/24* (2006.01)
*H02K 19/24* (2006.01)

(52) U.S. Cl.
CPC .............. *H02K 1/141* (2013.01); *H02K 1/246* (2013.01); *H02K 19/24* (2013.01); *H02K 2201/06* (2013.01)

(58) Field of Classification Search
CPC ............ H02K 1/14; H02K 1/24; H02K 19/24; H02K 1/265; H02K 1/141; H02K 1/148;

(Continued)

(56) References Cited

U.S. PATENT DOCUMENTS 5,148,090 A * 9/1992 Oku ...................... H02K 19/103
310/106
5,773,908 A * 6/1998 Stephens ................ H02K 1/146
310/156.47

(Continued)

FOREIGN PATENT DOCUMENTS

CN 101699713 4/2010
CN 202206208 4/2012

(Continued)

OTHER PUBLICATIONS

European Search Report and Opinion for Patent Application No. EP19216665.0 dated Jun. 3, 2020, 7 pages.

(Continued)

*Primary Examiner* — Naishadh N Desai
(74) *Attorney, Agent, or Firm* — Brinks Gilson & Lione (57) ABSTRACT

An electromechanical system comprising: a rotor comprising a plurality of teeth spaced about a circumference of the rotor, wherein the teeth of the rotor are equally spaced about the rotor according to a tooth spacing angle, and are skewed in an axial direction such that the circumferential positions of the teeth of the rotor vary along the axial length of the rotor, and first and second stator segments, each extending partway about the rotor and comprising a field winding and poles arranged to magnetically interact with the teeth of the rotor such that an alternating current (AC) back-emf is induced in the field winding upon rotation of the rotor. The poles of the first stator segment are angularly displaced about the rotor from the poles of the second stator segment such that the back-emf induced in the field winding of the first stator segment is phase shifted with respect to the back-emf induced in the field winding of the second stator segment.

18 Claims, 5 Drawing Sheets

(58) Field of Classification Search
CPC .... H02K 41/02; H02K 1/246; H02K 2201/15; H02K 2201/06
See application file for complete search history.

(56) References Cited

U.S. PATENT DOCUMENTS

| | | | |
|---|---|---|---|
| 10,790,713 B2* | 9/2020 | Mochida | H02K 15/03 |
| 2010/0277026 A1* | 11/2010 | Yamaguchi | H02K 21/16 |
| | | | 310/156.25 |
| 2012/0139372 A1* | 6/2012 | Nakano | H02K 29/03 |
| | | | 310/83 |
| 2014/0035418 A1* | 2/2014 | Horst | H02K 1/187 |
| | | | 310/156.12 |

FOREIGN PATENT DOCUMENTS

| | | |
|---|---|---|
| CN | 202503378 | 10/2012 |
| EP | 2 234 250 A1 | 9/2010 |
| GB | 2 518 690 A | 4/2015 |

OTHER PUBLICATIONS

Great Britain search report dated Jun. 24, 2019, issued in GB Patent Application No. 1900537.0.

* cited by examiner

ELECTROMECHANICAL SYSTEM

CROSS-REFERENCE TO RELATED APPLICATIONS

This specification is based upon and claims the benefit of priority from UK Patent Application Number GB1900537.0 filed on 15 Jan. 2019, the entire contents of which are incorporated herein by reference.

BACKGROUND

Technical Field

The present disclosure relates to an electromechanical system. In particular, the present disclosure relates to a system having a plurality of stator segments for use with a toothed rotor for e.g. the production of electricity from rotation of the toothed rotor.

Description of the Related Art

Electromechanical systems, such as electrical generators and motors, are generally formed of a stator and a rotor that rotates with respect to the stator. Both generators and motors operate by way of an interaction between a magnetic field and an electrical current passing through a winding.

In motors, a current is supplied to the winding and interaction between the winding and the magnetic fields results in an electromagnetic force, which causes rotation of the rotor. In generators, rotation of the rotor (i.e. as a result of an external force) results in interaction between the magnetic field in the winding (e.g. due to relative movement therebetween) so as to generate a current in the winding. For example, in the case of a generator, the rotor may be cylindrical and formed of laminated steel. The generator may include a field winding for the purpose of generating a magnetic field, and an output winding (e.g. an armature coil) for providing an output alternating current (AC). The magnetic field generated by the field winding may change (e.g. orientation) with respect to the output winding due to movement of the rotor (and magnetic interaction with the rotor), which may induce a current in the output winding.

In some cases, this may also result in an AC back-emf being induced in the field winding. This can cause issues with the supply current (e.g. direct current (DC)) of the field winding. For example, it can cause issues with the control and/or regulation of the voltage of the supply current. Further, the presence of induced harmonics (i.e. as a result of the induced back-emf) in the field winding current can affect the output current of the output winding, leading to reduced efficiency.

Further, in typical generators/motors the stator is a continuous structure encircling the entire circumference of the rotor. In some environments this can make it difficult to access internal portions of the stator and other parts of the generator/motor that are enclosed by the stator. For example, maintenance and/or repair of the stator may require removal of the stator axially with respect to the rotor. Where the motor/generator forms part of e.g. an engine, this can necessitate significant disassembly of the engine. For example, pipes, harnesses and structural components may need to be removed to access a motor/generator for maintenance or repair.

Continuous annular stators can also take up significant space around a rotor. This can make it difficult to locate generators/motors having such stators in environments where space is limited (e.g. turbine gas engines).

There is a need to provide an electromechanical system that alleviates the above issues.

SUMMARY

The present disclosure provides an electromechanical system and a method of assembling an electromechanical system as set out in the appended claims.

In a first aspect, there is provided an electromechanical system comprising: a rotor comprising a plurality of teeth spaced about a circumference of the rotor; and first and second stator segments, each extending partway about the rotor and comprising a field winding and poles arranged to magnetically interact with the teeth of the rotor such that an alternating current (AC) back-emf is induced in the field winding upon rotation of the rotor; wherein the poles of the first stator segment are angularly displaced about the rotor from the poles of the second stator segment by a phase shift angle, the phase shift angle not equaling a multiple of the tooth spacing angle, and the teeth of the rotor are skewed in an axial direction such that the circumferential positions of the teeth of the rotor vary along the axial length of the rotor.

Stator segments (which extend only partway about the circumference of a rotor in use) may provide better serviceability than a typical (i.e. annular) stator that extends for the entire circumference of a rotor. That is, the stator segments may be more easily removed, and may allow easier access to a rotor about which it extends (e.g. for repair and maintenance). The stator segments may, for example, not need to be removed from the rotor in an axial direction (as may otherwise by the case with annular shaped stators). Additionally, such stator segments may take up less space (e.g. in a turbine engine) than an annular stator. This space may therefore be used for other components (e.g. of the turbine engine).

By arranging stator segments such that their poles are angularly displaced, the poles of one stator segment may align with teeth of the rotor at different times to the poles of another stator segment. That is, when the poles (or at least some of the poles) of a stator segment are aligned with teeth of the rotor, the poles of another stator segment may not be aligned with teeth of the rotor. Given the induced back-emf (in the field windings) is a result of the interaction of the poles and teeth of the rotor, the induced back-emf of one field winding will be phase shifted with respect to the back-emf of the other winding.

When the back-emf's are combined (so as to be superimposed), the phase shift can result in one back-emf at least partially cancelling out the other. In this way, the angular displacement of the poles of the first and second stator segments (which results in the phase difference between the back-emf's) may help to reduce or eliminate a combined (i.e. net) back-emf of the field windings of the stator segments. This can lead to better control and voltage regulation of the excitation of the field windings, and can lead to a more efficient system.

The term "circumferential" is used herein to describe a direction that is generally parallel to the circumference of the rotor. Similarly, the term "radial" is used to describe a direction extending generally parallel to a radius of the stator (and generally perpendicular to the circumferential direction).

Optional features are now described. These are applicable singly or in any combination with any aspect.

In some embodiments the field windings of the first and second stator segments may be electrically connected to one another. The field windings may be electrically connected such that the back emf of the first stator field winding is superimposed with the back-emf of the second stator field winding (i.e. so as to cancel one another out or so as to form a net back-emf). The field windings may be electrically connected in series.

In some embodiments the poles of the first stator segment may be angularly displaced from the poles of the second stator segment such that the back-emf induced in the field winding of the first stator segment is substantially in anti-phase with the back-emf induced in the field winding of the second stator segment. Thus, when the back-emf of the first stator segment field winding is superimposed with the back-emf of the second stator segment winding they may (i.e. completely) cancel one another out.

In some embodiments the teeth of the rotor may be equally spaced about the rotor according to a tooth spacing angle. The tooth spacing angle may be calculated as follows:

$$T_s = \frac{360}{N_t}$$

where Ts is the tooth spacing angle in degrees and $N_t$ is the number of teeth on the rotor.

The poles of the first segment may be angularly displaced from the poles of the second segment by a phase shift angle wherein the phase shift angle is not a multiple of the tooth spacing angle.

In other words, the phase shift angle may consist of an angle that is less than the tooth spacing angle, or that is a combination of that angle (that is less than the tooth spacing angle) with a multiple of the tooth spacing angle.

Thus, as is set forth above, when the poles of one stator segment are aligned with respective teeth of the rotor, the poles of the other stator segment may be circumferentially offset from teeth of the rotor. The polarity and magnitude of the back-emf in each field winding may be affected by (or may be a result of) the position of the respective poles of the stator segment with respect to the teeth of the rotor (i.e. due to the magnetic interaction between the poles and the rotor teeth). Thus, at an instantaneous point in time, the polarity and/or magnitude of the back-emf in the field winding of the first stator segment may be different to (i.e. phase shifted from) the polarity and/or magnitude of the back-emf in the field winding of the second stator segment (due to the angular displacement of their poles).

In some embodiments each stator segment may comprise first and second stator portions. Each stator portion may comprise connected inner and outer radially extending poles, and a bridge spacing the stator portions. The bridge may comprise the field winding. The inner pole of the first stator portion and outer pole of the second stator portion may define a first pole pair. The inner pole of the second stator portion and the outer pole of the first stator portion may define a second pole pair.

In operation, when the rotor teeth align with the first pair of poles of a stator segment, they may not be aligned with the second pair of poles (and vice-versa). Alternating alignment between the two pairs of poles of a stator segment may provide a changing magnetic field, which in turn may allow the stator segment to produce an electric current (and which may also result in the back-emf being induced).

In some embodiments the poles of each stator segment may extend (i.e. inwardly) in a substantially radial direction of the stator segment. In this way, distal ends of the poles (i.e. distal from their connections with one another) align with teeth of a rotor in use.

Each stator portion of each stator segment may be generally U-shaped. In this respect, the poles of each stator portion may form legs of the U shape of the stator portion.

Each stator portion of each stator segment may be integrally formed and may be formed of a ferrous material. For example, the stator portions may be formed of iron. The stator portions and bridge of each stator segment may be integrally or separately formed. The bridge of each stator segment may be formed of a ferrous material (e.g. iron).

The dimensions of each stator segment may be determined, for example, by way of the following equation:

$$b_{ss} + 2b_{ts} + h_m = \frac{D_{si}}{P} \cdot \pi$$

In which:
P is the number of rotor teeth;
$D_{si}$ is the stator inner diameter;
$b_{ss}$ is the distance between the inner and outer poles of each stator portion;
$b_{ts}$ is the width of each pole; and
$h_m$ is the distance between the stator portions.

When the poles of each stator segment are evenly spaced, the circumferential spacing of the poles may be half of the spacing of the rotor teeth such that the teeth of the rotor align with every second pole of the stator segment.

In some embodiments the stator segments may have the same arrangement of poles. That is, the stator segments may have the same number of poles and the poles of one stator segment may have the same spacing as the poles of the other stator segment. The stator segments may be the same or substantially the same.

In some embodiments the first pole pair of the first stator segment is angularly displaced by the phase shift angle from the first pole pair of the second stator segment. The inner poles of the first pole pairs may be angularly displaced from one another by the phase shift angle. The outer poles of the first pole pairs may be angularly displaced from one another by the phase shift angle.

In some embodiments the second pole pair of the first stator segment are angularly displaced by the phase shift angle from the second pole pair of the second stator segment. The inner poles of the second pole pairs may be angularly displaced from one another by the phase shift angle. The outer poles of the second pole pairs may be angularly displaced from one another by the phase shift angle.

In some embodiments, the phase shift angle may be defined by the following relationship Phase Shift Angle (in degrees)=$360/(p(2k))$ Where p in this instance is the number of teeth of the rotor divided by two. k denotes the harmonic number e.g. 3, 5, 7 etc to be cancelled with respect to the fundamental harmonic.

The output fundamental voltage will cycle electrically through 360 degrees when the rotor rotates by an angle corresponding to two rotor teeth (or one tooth pair). The kth harmonic will also cycle through 360 degrees electrically when the rotor rotates by 1/kth of the previous angle. To cancel the kth harmonic then, the induced voltage for the kth harmonic needs to be 180 degrees phase shifted from one stator segment to the next so that they are cancelled when combined in series. In some embodiments the field winding of each stator segment is wound around at least a portion of the respective bridge of the stator segment.

Each stator segment may further comprise a permanent magnet (e.g. a hybrid system). In this respect, the magnetic field generated by each stator segment may be a generated by both the field winding and one or more permanent magnets. The permanent magnet may be disposed on or form part of the bridge.

In some embodiments the bridge of each stator segment may extend in a substantially circumferential direction of the stator segment i.e. the stator portions of each stator segment may be circumferentially spaced from one another. The bridge of each stator segment may extend between the inner poles of the stator portions. The bridge of each stator segment may be connected to a central portion of each inner pole (i.e. each opposing end of the bridge may be connected to a respective inner pole at a portion that is centrally located with respect to a longitudinal axis of the inner pole).

The bridge of each stator segment may extend between connector portions (e.g. circumferentially-extending connector portions) of the stator portions, the connector portions connecting the inner and outer poles of each stator portion. The bridge of each stator segment may comprise a circumferentially extending central portion and radially extending outer portions at opposing ends of the central portion. The radially extending outer portions may connect the central portion of the bridge to a respective stator portion (e.g. the connector portion of the stator portion).

In some embodiments each stator segment may comprise an armature coil defining a coil interior. As will be described further below, an AC voltage may be induced in the armature coil of each stator segment upon rotation of the rotor. The field winding may be oriented generally perpendicularly to the armature coil. That is, a centrally extending axis of the field winding may be oriented generally perpendicularly to a centrally extending axis of the field winding.

In some embodiments the armature coil of each stator segment may be wound around the inner poles of the respective stator segment. Recesses may be defined between the inner and outer poles of each stator portion of each stator segment. Opposing ends of the armature coil of each stator segment may be located in the recesses defined between the inner and outer poles. In this respect an inner surface (or inner surfaces) of the armature coil of each stator segment may contact respective outer surfaces of the inner poles. The armature coil of each stator segment may be spaced from the outer poles. That is, there may be an air gap in the recess between the armature coil and the outer poles.

In some embodiments at least a portion of the field winding of each stator segment may be located in the coil interior of the respective stator segment. In some embodiments at least one of the north or south poles of the magnetic field generated by the field winding of each stator segment may be located in the coil interior of the respective stator segment. In some embodiments both of the north and south poles of the magnetic field generated by the field winding of each stator segment may be located in the coil interior of the respective stator segment.

In some embodiments the field winding of each stator segment may be spaced from the respective coil interior of the stator segment. That is, both of the north and south poles of the magnetic field generated by the field winding may be spaced from the coil interior. The field winding of each stator segment (i.e. including the north and south poles of the magnetic field) may be spaced radially from the coil interior of the respective stator segment.

As discussed briefly above, each stator segment may be able to provide an electrical current in the armature coil by way of electromagnetic induction caused by changes in the magnetic field that is generated by the field winding. In particular, for each stator segment, two different magnetic paths may be formed in two positions of the rotor. In each position the magnetic path passes between the respective stator segment and the rotor at an inner pole of one stator portion and the outer pole of the other stator portion. These two different magnetic paths pass through the coil interior (of the armature coil) in different directions. One path passes in a generally radially outward direction and the other path passes in a generally radially inward direction (i.e. depending on which pole pair is aligned with rotor teeth). This change in direction of the magnetic field (with respect to the armature coil), as the rotor rotates, results in the electromagnetic induction of the armature coil.

In some embodiments the first and second stator segments may be angularly displaced about the circumference of the rotor. The first and second stator segments may be circumferentially spaced (i.e. so as not to overlap circumferentially).

In some embodiments the first and second stator segments may be axially displaced from one another. The stator segments may be circumferentially aligned (i.e. having the same circumferential position). When aligned in this way, the stator segments may have different arrangements of poles from one another (i.e. such that the poles remain angularly displaced), such that the stator segments have a different structure to one another. Alternatively, the stator segments may both have the same arrangement of poles, but the poles may be arranged non-symmetrically and one of the stator segments may have a reversed orientation (i.e. rotated 180 degrees) such that the poles of the stator segments are angularly displaced.

The teeth of the rotor are circumferentially skewed with respect to the axial direction (i.e. of the rotor). By being skewed, it is meant that the circumferential position of a tooth may vary along the axial length of the rotor; for example a tooth may be stepped so that its circumferential position changes discretely along its axial length, or it may follow a helical or partial helical path. Skewing of the rotor teeth may additionally be used in combination with phase angle to cancel back EMF in the segmented stator. For example, the phase shift angle may be used to predominantly cancel a particular harmonic (e.g. n=3) and skew of the rotor teeth used to predominantly cancel another harmonic (e.g. n=5).

In some embodiments the system comprises any number of further (e.g. third, fourth, fifth, etc.) stator segments extending partway about the rotor. Each further stator segment may be as described above. Each stator segment may have poles angularly displaced from the poles of all, or some of, the other stator segments. In embodiments with an even number of stators, half of the stators may be angularly displaced by the same angle from the other half of the stators.

The electromechanical system may be an electrical generator. The electrical generator may be for generating electricity in a gas turbine engine.

In a second aspect there is disclosed a method of assembling an electromechanical system, the method comprising: providing first and second stator segments, each stator segment comprising a field winding and poles, providing a rotor, the rotor comprising an axis of rotation and a plurality of teeth, the teeth of the rotor being equally spaced about the rotor according to a tooth spacing angle and skewed in an axial direction such that the circumferential positions of the teeth of the rotor vary along the axial length of the rotor; mounting the first and second stator segments to the rotor, such that the poles of each stator are arranged to magnetically interact with the teeth of the rotor to induce an alternating current (AC) back-emf in the field winding upon rotation of the rotor, wherein the poles of the first stator segment are angularly displaced about the rotor from the poles of the second stator segment by a phase shift angle which is not a multiple of the tooth spacing angle, such that the back-emf induced in the field winding of the first stator segment is phase shifted with respect to the back-emf induced in the field winding of the second stator segment when the rotor is rotated.

In a third aspect, there is provided an electromechanical system comprising: a rotor comprising a plurality of teeth equally spaced about a circumference of the rotor according to a tooth spacing angle; and first and second stator segments, each extending partway about the rotor and comprising a field winding and poles arranged to magnetically interact with the teeth of the rotor; wherein the poles of the first stator segment are angularly displaced about the rotor from the poles of the second stator segment by a phase shift angle that is not a multiple of the tooth spacing angle.

The stator segments and rotor of the third aspect may be as otherwise defined with respect to the first aspect.

The skilled person will appreciate that except where mutually exclusive, a feature described in relation to any one of the above aspects may be applied mutatis mutandis to any other aspect. Except where mutually exclusive any feature described herein may be applied to any aspect and/or combined with any other feature described herein.

DESCRIPTION OF THE DRAWINGS

Embodiments will now be described by way of example only with reference to the accompanying drawings in which.

DETAILED DESCRIPTION

Figure 1A:
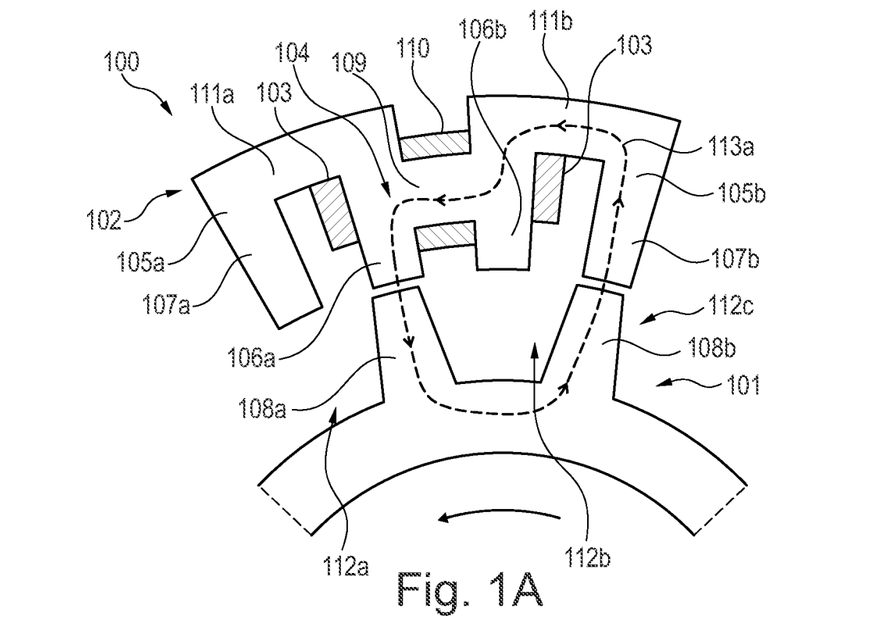
FIGS. 1A and 1B are schematics showing a first embodiment of the electromechanical system.
Figure 1B:
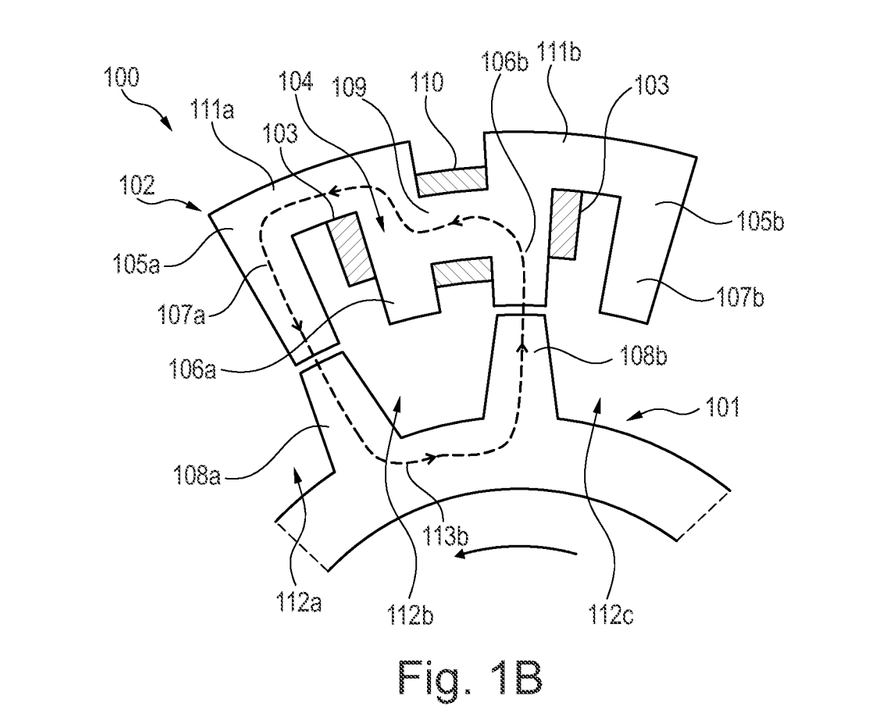

The electromechanical system 100 illustrated in FIGS. 1A and 1B is an electrical generator, which comprises a toothed rotor 101 and a plurality of stator segments. For the purpose of explaining the operation of the stator segments and rotor, only one stator segment 102 is shown. The stator segment 102 extends partway about the circumference of the rotor 101.

The stator segment 102 comprises an armature coil 103 defining a coil interior 104 and first 105a and second 105b spaced (generally U-shaped, ferrous) stator portions. Each stator portion 105a, 105b comprises connected inner 106a, 106b and outer 107a, 107b radially extending poles for magnetic interaction with teeth 108a, 108b of the rotor 101.

As is apparent from the figures, the inner pole 106a, 106b of each stator portion 105a, 105b passes through the coil interior 104, and the outer pole 107a, 107b of each stator portion 105a, 105b is provided outside of the coil interior 104. The stator segment further comprises a bridge 109 connecting (and integrally formed with) the stator portions 105a, 105b. The bridge 109 comprises a field winding 110, arranged to generate a magnetic field between the second stator portion 105b and the first stator portion 105a. The rotor 101 does not have any excitation mounted thereon.

As will be described in further detail below, the stator segment 102 and circumferentially-spaced teeth 108a, 108b of the toothed rotor 101 interact to produce an alternating current in the armature coil 103 (i.e. by way of electromagnetic induction). Although only two teeth 108a, 108b are shown, it should be appreciated that the rotor 101 comprises a plurality of teeth evenly spaced about its circumference.

The bridge 109 extends in a substantially circumferential direction (i.e. generally parallel to a circumference of the rotor 101) between the inner poles 106a, 106b so as to connect the armature portions 105a, 105b. In particular, the bridge 109 may be connected to a central portion of each inner pole 106a, 106b. That is, each opposing end of the bridge 109 is connected to a respective inner pole 106a, 106b at a portion of the inner pole 106a, 106b that is centrally located with respect to a longitudinal axis of the inner pole 106a, 106b.

This arrangement of the bridge 109 results in recesses being defined between the inner poles 106a, 106b and either side of the bridge 109. The field winding 110 is wound around the bridge 109 so as to be received in the recesses. The width of the field winding 110 (i.e. in the circumferential direction of the stator segment/rotor) is substantially the same as the length of the bridge 109 (again, in the circumferential direction) such that the field winding 110 extends substantially across a width of the recesses.

The orientation of the field winding 110 (wound around the bridge 109 so as to be perpendicular to the armature coil 103) is such that, when a current (e.g. a DC current) is passed through the field winding 110, a magnetic field is generated which has a direction extending from the second armature portion 105b to the first armature portion 105a. That is, the field winding 110 generates a magnetic field that has a north pole at an end of the bridge 109 proximate the second armature portion 105b and a south pole at an end of the bridge 109 proximate the first armature portion 105a. As will be described further below, it is this magnetic field that induces a voltage in the armature coil 103 and, in this respect, the current (DC current) passed through the field winding 110 can be used to control the current (AC current) that is a result of the induced voltage in the armature coil 103.

The armature coil 103 is wound around the inner poles 106a, 106b such that it is oriented generally perpendicularly to the field winding 110. In this respect, opposing ends of the armature coil 103 are located in recesses defined between the inner 106a, 106b and outer poles 107a, 107b of each stator portion 105a, 105b. Thus, inner surfaces of the armature coil 103 contact respective outer surfaces of the inner poles 106a, 106b, whilst outer surfaces of the armature coil 103 are spaced from the outer poles 107a, 107b (such that there is an air gap between the armature coil 103 and the outer poles 107a, 107b).

The arrangement of the armature coil 103 and field winding 110 is such that the field winding 110 passes through the coil interior 104 of the armature coil 103. As a result, the north and south poles of the magnetic field generated by the field winding 110 are located in the coil interior 104.

The poles 106a, 106b, 107a, 107b extend inwardly in a substantially radial direction of the stator segment 102. In this way, ends of the poles 106a, 106b, 107a, 107b (proximate the rotor 101) may align with the teeth 108a, 108b of the rotor 101. Each pair of inner and outer poles 106a, 106b, 107a, 107b is connected by connecting portions 111a, 111b that extend circumferentially between the poles 106a, 106b, 107a, 107b.

As is apparent, in use, the rotor 101 undergoes rotation (in this case, in a counter-clockwise direction). In practice, this will be in the form of a continuous rotation. For the purpose of explaining the operation of the system 100, FIG. 1A shows the rotor 101 in a first position, whilst FIG. 1B shows the rotor 101 in a second position (in which the rotor 101 has been rotated counter-clockwise. Rotation of the rotor 101 between the two positions results in different alignments of the teeth 108a, 108b and air gaps 112a, 112b, 112c (defined between the teeth) with the poles 106a, 106b, 107a, 107b.

In the first position, the inner pole 106a of the first stator portion 105a is aligned with a tooth 108a of the rotor 101, and the inner pole 106b of the second stator portion 105b is aligned with an air gap 112b. Similarly, in the first position, the outer pole 107b of the second stator portion 105b is aligned with another tooth 108b of the rotor 101, and the outer pole 107a of the first stator portion 105a is aligned with an air gap 112a.

In this way, in the first position, the inner pole 106a of the first stator portion 105a and outer pole 107b of the second stator portion 105b magnetically interact with the rotor 101. Conversely, the air gaps 112a, 112b prevent magnetic interaction of the inner pole 106b of the second stator portion 105b and outer pole 107a of the first stator portion 105a with the rotor. Thus, a magnetic field is formed between the rotor 101 and the field winding 110 of the stator segment 102 via the inner pole 106a of the first stator portion 105a and outer pole 107b of the second stator portion 105b. In the present figure, that magnetic field is illustrated by way of a magnetic path 113a.

In the second position (FIG. 1B) the inner pole 106b of the second stator portion 105b is aligned with a tooth 108b of the rotor 101, and the inner pole 106a of the first stator portion 105a is aligned with an air gap 112b. The outer pole 107a of the first stator portion 105a is aligned with a tooth 108a of the rotor 101, and the outer pole 107b of the second stator portion 105b is aligned with an air gap 112c.

Hence, in the second position, a magnetic field (i.e. illustrated by way of magnetic path 113b) is defined between the rotor 101 and the field winding 110 via the inner pole 106b of the second stator portion 105b and the outer pole 107a of the first stator portion 105a.

As should be apparent, the two positions of the rotor 101 result in two different magnetic paths 113a, 113b. Due to the orientation of the field winding 110, both magnetic paths 113a, 113b extend in a generally counter-clockwise direction. The paths 113a, 113b, however, pass through the coil interior 104 of the armature coil 103 in different directions. In the first position, the magnetic path 113a passes through the coil interior 104 in a generally radially inward direction. In the second position, the magnetic path 113b passes through the coil interior 104 in a generally radially outward direction. This change in the magnetic field between the two positions of the rotor 101 results in the induction of an AC voltage in the armature coil 103.

It is the alignment of different pairs of the poles 106a, 106b, 107a, 107b with the teeth 108a, 108b of the rotor 101 that leads to this changing magnetic field. To allow for this alignment, the poles 106a, 106b, 107a, 107b have a circumferential spacing that is approximately half of the spacing of the teeth 108a, 108b of the rotor 101.

As will be discussed in more detail with reference to FIG. 3, as well as inducing a voltage in the armature coil 103, the changing magnetic field induces an AC back-emf in the field winding 110.

Figure 2:
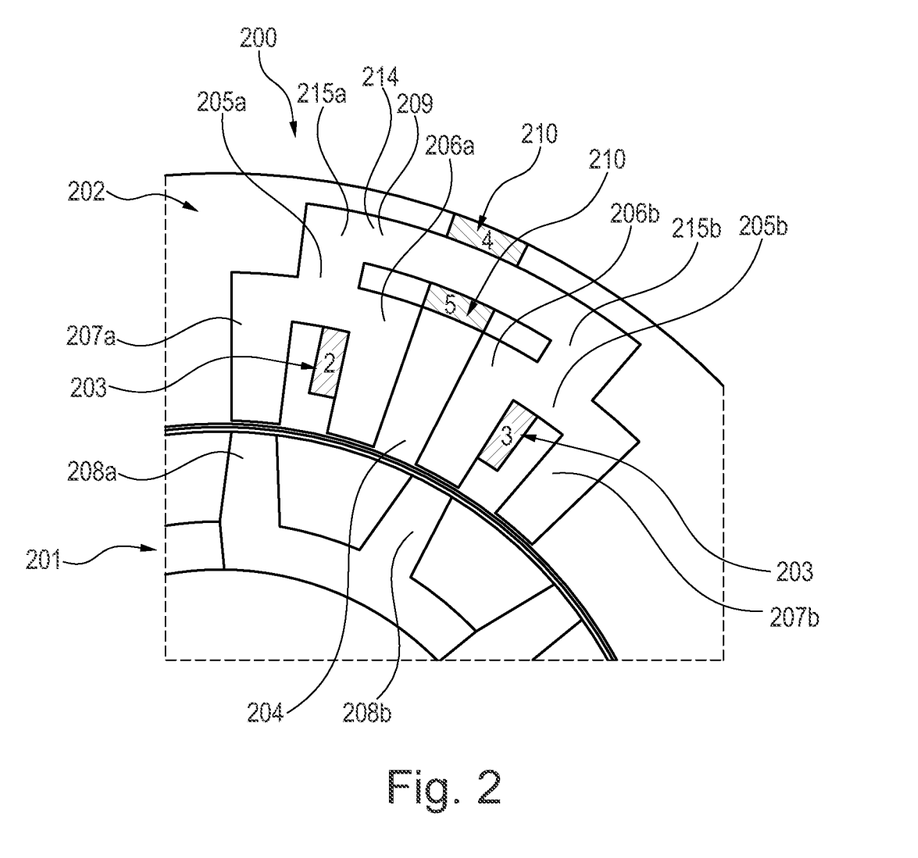
FIG. 2 is a schematic of a second embodiment of the electromechanical system.

FIG. 2 shows a second embodiment of the electromechanical system 200. Again, only a single stator segment 202 is shown. This system 200 is similar to the system 100 shown in FIGS. 1A and 1B, and for that reason, corresponding reference numerals have been used.

The system 200 differs from that described above in that the bridge 209 of the stator segment 201 does not extend between the inner poles 206a, 206b. Rather, the bridge 209 comprises a circumferentially extending central portion 214 and outer portions 215a, 215b that extend radially inwardly at opposing ends of the central portion 214 so as to connect the central portion 214 to the stator portions 205a, 205b. In this embodiment, a T-shaped recess is defined between the stator portions 205a, 205b and the bridge 209, and the field winding 210 extend through this T-shaped recess and is wound around the central portion 214 of the bridge 209.

Like the previously described embodiment, the armature coil 203 is wound around the inner poles 206a, 206b, such that (in the illustrated embodiment) the bridge 209 is radially spaced from the coil interior 204 of the armature coil 203. Thus, the field winding 210 does not overlap with the armature coil 203. This can, in some cases, make it easier to manufacture the system 200. Such an arrangement may also facilitate thermal management of the system 200. For example, the radial spacing of the bridge 209 results in a longer bridge 209 (i.e. compared to the previously described system 100) and, although not shown in the present figure, the windings of the field winding 210 can be spread out over the whole length of the bridge 209. This results in the windings having a larger exposed surface area so as to facilitate cooling of the windings.

Figure 3:
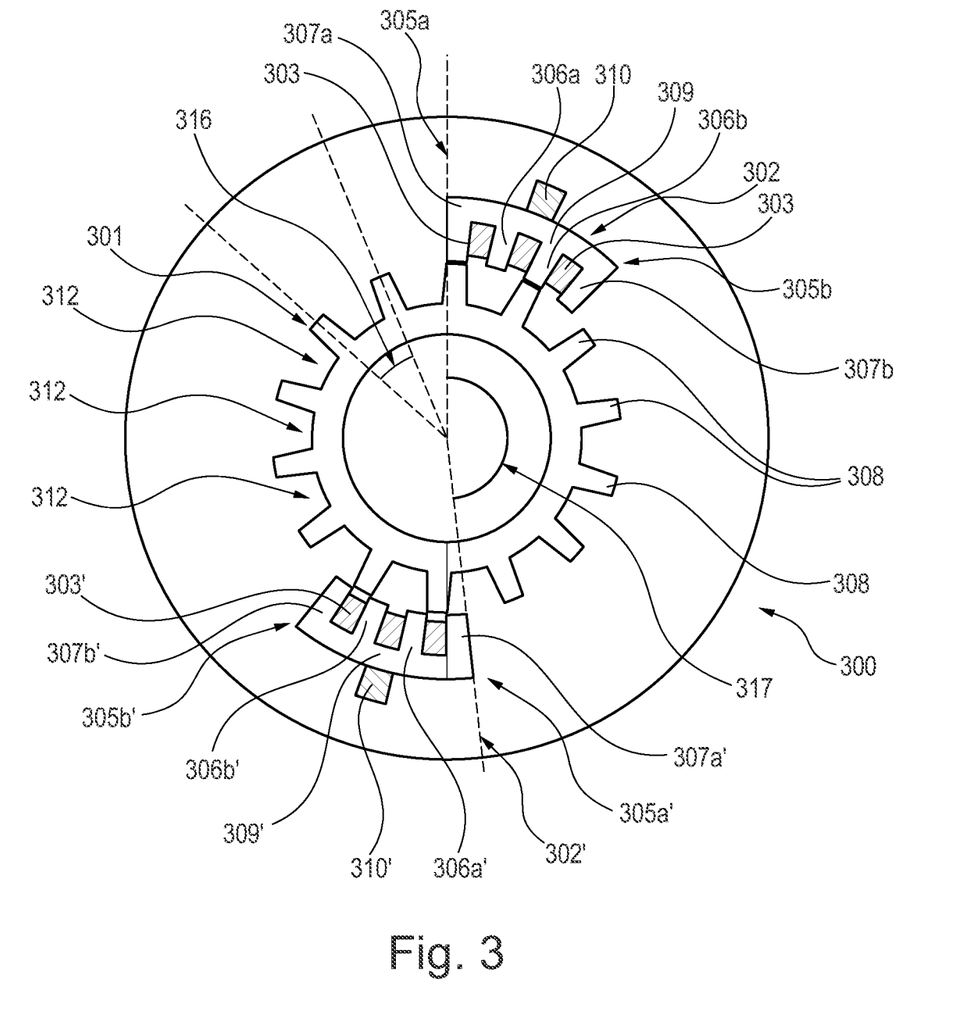
FIG. 3 is a schematic of a third embodiment of the electromechanical system.

FIG. 3 illustrates a system 300 comprising first 302 and second 302' stator segments. Each stator segment 302, 302' of FIG. 3 is, again, similar to those described above. As both of the stator segments 302, 302' are identical, for brevity, the differences between the stator segments 302, 302' and those described above will be discussed with reference to only one of the two stator segments 302. This stator segment 302 differs from those described above in that the bridge 309 extends between the inner poles 306a, 306b at radially outer portions of the inner poles 306a, 306b. Further, the recess defined between the stator portions 305a, 305b has a similar shape and size to a transverse profile of the field winding 310 such that the field winding 310 substantially fills the recess. Similarly, the recesses defined between the inner 306a, 306b and outer 307a, 307b poles of each stator portion 305a, 305b have a similar shape and size to a transverse profile of the armature coil 303 such that the armature coil 303 substantially fills these recesses. The field winding 310 is partially located in the coil interior 304 defined by the armature coil 303.

As is apparent from this figure, the stator segments 302, 302' are spaced circumferentially about the rotor 301. Thus, the poles 306a, 306b, 307a, 307b of the first stator segment 302 are spaced circumferentially from the poles 306a', 306b', 307a', 307b' of the second stator segment 302'. In particular, the poles 306a, 306b, 307a, 307b of the first stator segment 302 are angularly displaced from the poles 306a', 306b', 307a', 307b' of the second stator segment 302' by a phase shift angle 317 that is not a multiple of a tooth spacing angle 316 (the tooth spacing angle 316 being the angle defining the spacing of the teeth 308 of the rotor 301).

Thus, and as is shown in FIG. 3, when a pair of poles 307a, 306b of the first stator segment 302 are aligned with teeth 308 of the rotor 301, the corresponding pair of poles 307a', 306b' of the second stator segment 302' are not aligned with teeth 308 of the rotor 301. In this embodiment, the angular displacement is such that the teeth 308 of the rotor 301 are midway between alignment with the corresponding pair of poles 307a', 306b' and the other pair of poles 306a', 307b' of the second stator segment 302'.

As previously discussed, the difference in alignment (due to the angular displacement) may reduce AC back-emf being induced in the field windings 310, 310' of the stator segments 302, 302'. That is, the phase of the back-emf induced in the field winding 310 of the first stator segment 302 may be different to (i.e. shifted with respect to) the phase of the back-emf induced in the field winding 310' of the second stator segment 302'. Although not apparent from the figure, the field windings 310, 310' are electrically connected in series such that the respective back-emf's are superimposed and at least partially cancel one another out.

Figure 4:
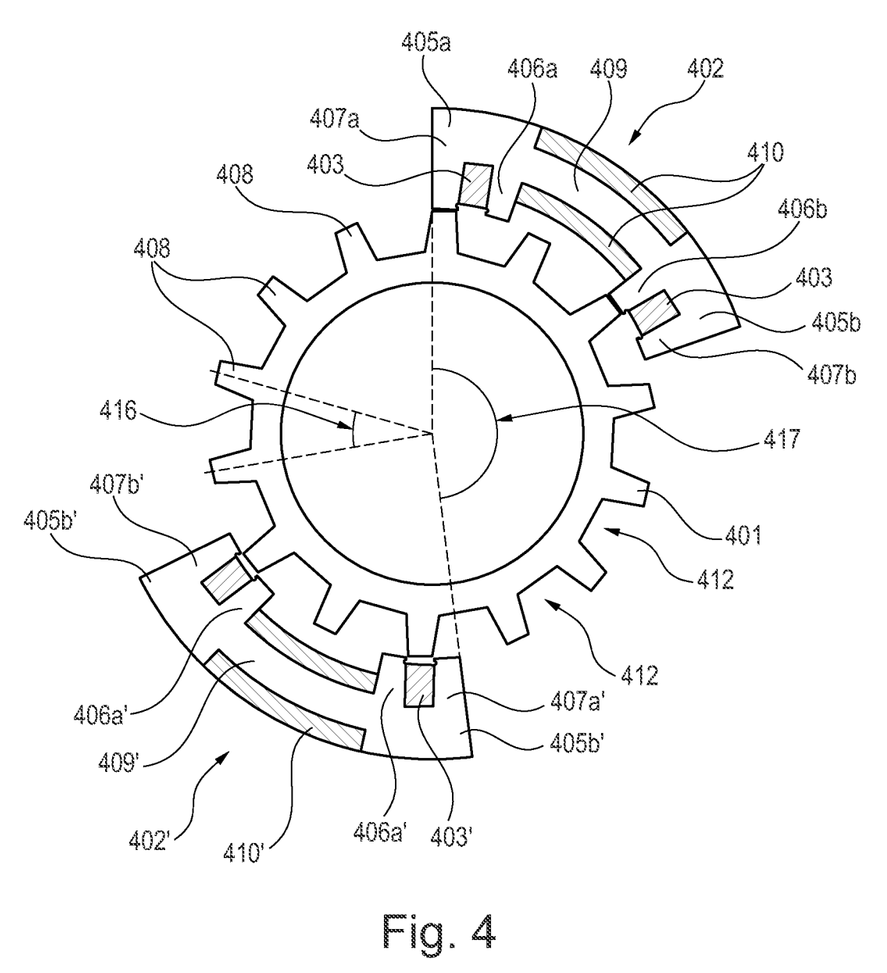
FIG. 4 is a schematic of a fourth embodiment of the electromechanical system.

FIG. 4 illustrates a further embodiment of the system 400 that, again, comprises two stator segments 402, 402'. The stator segments 402, 402' are again similar to those described above, but include some differences that will now be described. For brevity, these differences will only be discussed with reference to one of the stator segments 402 (although it should be appreciated that they apply to both stator segments 402, 402'). In previously described embodiments, the poles of each stator segment were evenly spaced. In the present embodiment, the poles 406a, 406b, 407a, 407b of the stator segment 402 are unevenly spaced. In particular, the spacing between the inner poles 406a, 406b is greater than the spacing between each inner pole 406a, 406b and its respective adjacent outer pole 407a, 407b.

The spacing between the inner pole 406a of the first stator portion 405a and the outer pole 407b of the second stator portion 405b is equivalent to two tooth spacings (i.e. twice the tooth spacing angle 416). As is shown in FIG. 3, this first pole pair are not aligned with teeth 408 of the rotor 401. The spacing of the other two poles 407a, 406b (i.e. the second pole pair) is also equivalent to two tooth spacings. This second pole pair 407a, 406b are aligned with teeth 408 of the rotor 401 that are spaced either side of a further tooth 408.

Like previously described embodiments, the poles 406a, 406b, 407a, 407b of the first stator segment 402 are angularly displaced from the poles 406a', 406b', 407a', 407b' of the second stator segment 402' by a phase shift angle that is not a multiple of the tooth spacing angle 416. As may be apparent the phase shift angle 417 may be considered a combination of a multiple of the tooth spacing angle 416 (in this case six tooth spacing angles 316) and a further angle that is less than the tooth spacing angle 416. This angular displacement is the same for the second pole pairs 406a, 407b, 406a', 407b'. Again, this arrangement can lead to at least partial cancellation of the superimposed back-emfs induced by the changing magnetic fields of the stator segments 402, 402'.

Figure 5:
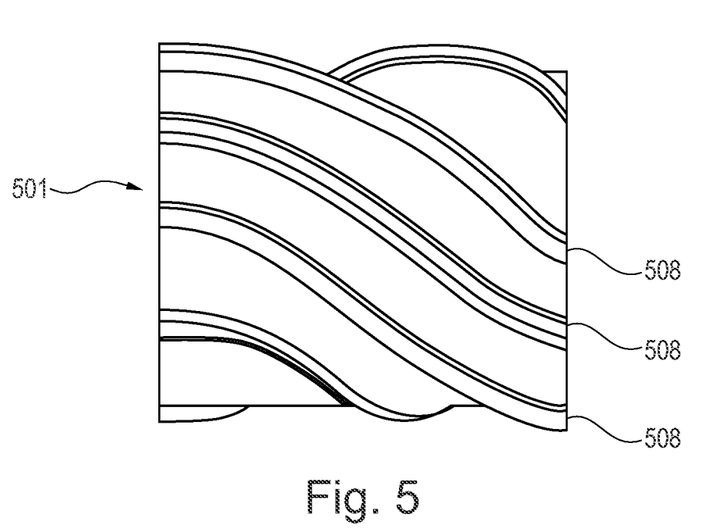
FIG. 5 is a side view of a first example of skewed rotor teeth.

FIG. 5 shows a side view of a first example of skewed rotor teeth 508. In this example, the teeth are continuous along the length of the rotor, and have a helical profile such that their circumferential position varies continuously as the tooth extends along the axial length of the rotor. It will be appreciated that the pitch (i.e. the gap between the teeth) and twist (i.e. the sharpness of the curve) of the teeth can be varied to suit the performance requirements of the system.

Figure 6:
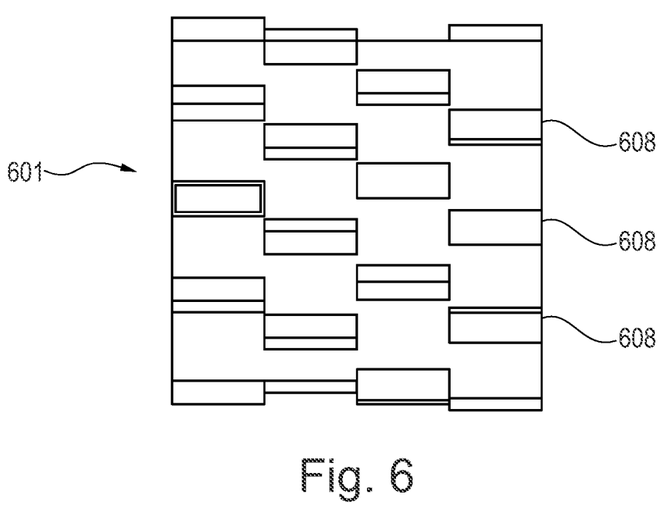
FIG. 6 is a side view of a second example of skewed rotor teeth.

FIG. 6 shows a side view of a second example of skewed rotor teeth 508. In this example, the teeth are stepped along the length of the rotor, such that their circumferential position varies discretely along the axial length of the rotor. It will be appreciated that the pitch and the circumferential stagger (i.e. the angle by which the teeth are shifted around the circumference of the rotor between axial steps) of the teeth can be varied according to the performance requirements of the system.

In the case of both designs, such as those shown in FIGS. 5 and 6, the skewing of the teeth means that the various back EMFs created in the various pole-teeth pairings around the rotor can be evened out to reduce or minimise the net back EMF of the system. The combination of phase shift angle and tooth skew can be used to cancel out multiple harmonics within the system, creating a system with improved voltage and current control, leading to improved efficiency.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:
1. An electromechanical system comprising:
a rotor comprising a plurality of teeth spaced about a circumference of the rotor; and
first and second stator segments, each extending partway about the rotor and each comprising a field winding and poles arranged to magnetically interact with the teeth of the rotor;
wherein the teeth of the rotor are equally spaced about the rotor according to a tooth spacing angle, such that in use, an alternating current (AC) back-emf is induced in the field winding upon rotation of the rotor;
wherein the poles of the first stator segment are angularly displaced about the rotor from the poles of the second stator segment by a phase shift angle, and wherein the phase shift angle is not a multiple of the tooth spacing angle; and,
wherein each stator segment comprises:
first and second stator portions, each stator portion comprising connected inner and outer radially inward extending poles;
a bridge spacing the stator portions, the bridge comprising the field winding; and,
wherein the inner pole of the first stator portion and outer pole of the second stator portion define a first pole pair, and the inner pole of the second stator portion and the outer pole of the first stator portion define a second pole pair.

2. The electromechanical system according to claim 1, wherein the first pole pair of the first stator segment are angularly displaced by the phase shift angle from the first pole pair of the second stator segment.

3. The electromechanical system according to claim 1, wherein the second pole pair of the first stator segment are angularly displaced by the phase shift angle from the second pole pair of the second stator segment.

4. The electromechanical system according to claim 1, wherein the field winding of each stator segment is wound around at least a portion of the bridge of the respective stator segment.

5. The electromechanical system according to claim 1, wherein each stator segment comprises an armature coil defining a coil interior.

6. The electromechanical system according to claim 5, wherein the inner poles of each stator segment pass through the coil interior of the respective armature coil of the stator segment, and the outer poles of each stator segment are provided outside of the coil interior.

7. The electromechanical system according to claim 1, wherein the field windings of the first and second stator segments are electrically connected to one another in series.

8. The electromechanical system according to claim 1, wherein the first and second stator segments are angularly displaced from one another about the circumference of the rotor.

9. The electromechanical system according to claim 1, wherein the electromechanical system is configured so that when the rotor teeth are aligned with the first pole pair of the first stator segment, the rotor teeth are aligned midway between the first and second pole pairs of the second stator segment.

10. The electromechanical system according to claim 1, wherein the electromechanical system is a generator.

11. A gas turbine engine comprising the generator of claim 10.

12. The electromechanical system according to claim 1, wherein the teeth of the rotor are skewed in an axial direction of the rotor such that the circumferential positions of the teeth of the rotor vary along the axial length of the rotor.

13. The electromechanical system according to claim 12, wherein the teeth of the rotor follow a helical or part-helical path.

14. The electromechanical system according to claim 1, wherein each tooth of the plurality of rotor teeth comprise a circumferentially extending outer edge and radially extending side edges; and, wherein adjacent teeth of the plurality of rotor teeth are separated by a gap defined between side edges of the adjacent teeth.

15. The electromechanical system according to claim 14, wherein a length of the circumferentially extending outer edge of each tooth is smaller than a width of a recess defined between the inner and outer poles of the first and second stator portions of the first and second stator segments.

16. A method of assembling an electromechanical system, the method comprising:
 providing first and second stator segments, each stator segment comprising first and second stator portions, each stator portion having connected inner and outer radially inward extending poles and a bridge spacing the stator portions, the bridge comprising a field winding, wherein the inner pole of the first stator portion and outer pole of the second stator portion define a first pole pair, and, the inner pole of the second stator portion and the outer pole of the first stator portion define a second pole pair
  providing a rotor, the rotor comprising an axis of rotation and a plurality of teeth, wherein the teeth of the rotor are equally spaced about the rotor according to a tooth spacing angle; and
  mounting the first and second stator segments to the rotor, such that the pole pairs of each stator segment are arranged to magnetically interact with the teeth of the rotor to induce an alternating current (AC) back-emf in the field windings upon rotation of the rotor; wherein the pole pairs of the first stator segment are angularly displaced about the rotor from the pole pairs of the second stator segment by a phase shift angle which is not a multiple of the tooth spacing angle, such that the back-emf induced in the field winding of the first stator segment is phase shifted with respect to the back-emf induced in the field winding of the second stator segment when the rotor is rotated.

17. The method according to claim 16, wherein the teeth of the rotor are skewed in an axial direction such that the circumferential positions of the teeth of the rotor vary along the axial length of the rotor.

18. The method according to claim 2, wherein the teeth of the rotor follow a helical or part-helical path.

* * * * *

UNITED STATES PATENT AND TRADEMARK OFFICE
CERTIFICATE OF CORRECTION

PATENT NO. : 11,171,524 B2
APPLICATION NO. : 16/733263
DATED : November 9, 2021
INVENTOR(S) : Chong et al.

Page 1 of 1

It is certified that error appears in the above-identified patent and that said Letters Patent is hereby corrected as shown below:

In the Claims

In Column 14, Claim 18, Line 40, delete "2" and replace with --17--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*